United States Patent
Weston et al.

(10) Patent No.: US 11,407,308 B1
(45) Date of Patent: Aug. 9, 2022

(54) SYSTEM AND METHOD FOR OPERATING VEHICLE IN SELECTED VEHICLE MODE

(71) Applicant: Ford Global Technologies, LLC, Dearborn, MI (US)

(72) Inventors: Keith Weston, Canton, MI (US); Daniel Joseph Dunn, Canton, MI (US); Matthew Johnson, Toledo, OH (US); Andrew Monticello, Farmington Hills, MI (US); Jonathan Michael Graves, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/342,791

(22) Filed: Jun. 9, 2021

(51) Int. Cl.
*B60W 30/02* (2012.01)
*B60K 23/04* (2006.01)
(Continued)

(52) U.S. Cl.
CPC ............ *B60K 23/04* (2013.01); *B60K 17/165* (2013.01); *B60K 17/20* (2013.01); *B60W 10/16* (2013.01); *B60W 30/02* (2013.01); *F16H 48/20* (2013.01); *B60K 2023/043* (2013.01); *B60K 2023/046* (2013.01); *B60W 2520/125* (2013.01);
(Continued)

(58) Field of Classification Search
CPC ...... B60K 23/04; B60K 17/20; B60K 17/165; B60K 2023/043; B60K 2023/046; F16H 48/20; F16H 2048/205; B60W 10/16; B60W 30/02; B60W 2520/14; B60W 2710/125; B60W 2520/125;
(Continued)

(56) References Cited

U.S. PATENT DOCUMENTS 5,505,267 A * 4/1996 Orbach ................. B60T 11/103
172/3
7,641,585 B2   1/2010 Baldet
(Continued)

FOREIGN PATENT DOCUMENTS

EP   0143975 A2 * 6/1985
JP   2002172951 A * 6/2002 ............. B60K 23/04

OTHER PUBLICATIONS

OS Giken Co., Ltd, OS SuperLock L.S.D., product pp. 1-16, Apr. 2010.
Eaton Performance Products, product pp. 1-20, 2018.

*Primary Examiner* — Justin Holmes
(74) *Attorney, Agent, or Firm* — Burris Law, PLLC (57) ABSTRACT

A system includes a differential, sensors, and a controller. The differential is operable in a first differential mode in which a first shaft and a second shaft are allowed to rotate at different speeds, and a second differential mode in which the differential inhibits relative rotation between the first and second shafts. The sensors are configured to measure vehicle operating conditions. The controller is in communication with the sensors and the differential. The controller, when the vehicle mode is selected, is configured to determine if an intended path of the vehicle is straight, determine if a vehicle speed is less than a predetermined vehicle speed, and operate the differential in the second differential mode for a predetermined time period in response to the controller determining that the intended path of the vehicle is straight and the vehicle speed is less than the predetermined vehicle speed.

20 Claims, 3 Drawing Sheets

(51) Int. Cl.
*B60K 17/16* (2006.01)
*F16H 48/20* (2012.01)
*B60W 10/16* (2012.01)

(52) U.S. Cl.
CPC ..... *B60W 2520/14* (2013.01); *B60W 2540/18* (2013.01); *B60W 2710/125* (2013.01); *B60Y 2300/02* (2013.01); *B60Y 2300/84* (2013.01); *B60Y 2400/802* (2013.01); *F16H 2048/205* (2013.01)

(58) Field of Classification Search
CPC ........... B60W 2540/18; B60Y 2300/02; B60Y 2300/84; B60Y 2400/802
See application file for complete search history.

(56) References Cited

U.S. PATENT DOCUMENTS

| | | | |
|---|---|---|---|
| 9,605,740 B2 * | 3/2017 | Povirk | B60K 17/344 |
| 9,784,354 B2 | 10/2017 | Monticello | |
| 10,513,178 B2 | 12/2019 | Alfredson et al. | |

\* cited by examiner

SYSTEM AND METHOD FOR OPERATING VEHICLE IN SELECTED VEHICLE MODE

FIELD

The present disclosure relates to a system and method for operating a vehicle in a selected vehicle mode.

BACKGROUND

The statements in this section merely provide background information related to the present disclosure and may not constitute prior art.

A vehicle includes a powertrain system and a drivetrain system. The powertrain system includes, inter alia, an engine and a transmission. The drivetrain system may include, inter alia, a propeller shaft, a primary axle, a secondary axle, and a differential such as a rear differential, for example. Rotary power (vehicle torque) generated by the powertrain system is transmitted to the drivetrain system. That is, rotatory power generated by the powertrain system is transmitted to the primary axle to drive a set of wheels. The primary axle includes a first shaft and a second shaft. The first shaft drives a first wheel of the set of wheels and the second shaft drives a second wheel of the set of wheels. The differential is connected to the propeller shaft and the primary axle, and is operable in a first differential mode in which the first shaft and the second shaft are allowed to rotate at different speeds, and a second differential mode in which the differential inhibits relative rotation between the first shaft and the second shaft. In typical vehicles including a differential, the differential operates in a first differential mode when a user selects a vehicle mode for straight line acceleration. The present disclosure provides a system and method for improved operation when the user selects to operate the vehicle in the vehicle mode where it is desirable for the differential to operate in the second differential mode.

SUMMARY

This section provides a general summary of the disclosure and is not a comprehensive disclosure of its full scope or all of its features.

In one form, the present disclosure provides a system for operating a vehicle in a vehicle mode. The system includes a drive axle, a plurality of sensors, and a controller. The drive axle has a first shaft and a second shaft. The first shaft is configured to drive a first wheel of a set of vehicle wheels and the second shaft is configured to drive a second wheel of the set of vehicle wheels. The differential is operable in a first differential mode in which the first shaft and the second shaft are allowed to rotate at different speeds, and a second differential mode in which the differential inhibits relative rotation between the first and second shafts. The plurality of sensors are configured to measure vehicle operating conditions. The controller is in communication with the plurality of sensors and the differential. The controller, when the vehicle mode is selected, is configured to determine if an intended path of the vehicle is straight based on signals from the plurality of sensors, determine if a vehicle speed is less than a predetermined vehicle speed based on the signals from the plurality of sensors, and operate the differential in the second differential mode for a predetermined time period in response to the controller determining that the intended path of the vehicle is straight and the vehicle speed is less than the predetermined vehicle speed.

In some configurations, the differential is an electronic limited slip differential.

In some configurations, the differential is a limited slip differential.

In some configurations, the predetermined vehicle speed is equal to or less than 80 kilometers per hour.

In some configurations, the predetermined time period is equal to or less than 300 milliseconds.

In some configurations, the plurality of sensors include a first sensor, a second sensor, and a third sensor. The first sensor is configured to measure a yaw rate of the vehicle. The second sensor is configured to measure a steering angle of a steering wheel of the vehicle. The third sensor is configured to measure lateral acceleration of the vehicle. The controller determines a yaw rate error based on the measured yaw rate and determines that the intended path of the vehicle is straight when the yaw rate error is equal to or less than a predetermined yaw rate error and/or the measured yaw rate is equal to or less than a predetermined yaw rate, the measured steering angle is equal to or less than a predetermined steering angle, and the measured lateral acceleration is equal to or less than a predetermined lateral acceleration.

In some configurations, the plurality of sensors include a first sensor and a second sensor. The first sensor is configured to measure a speed of the vehicle and the second sensor is configured to measure at least one of a value indicative of a yaw rate error of the vehicle, a yaw rate of the vehicle, a steering angle of a steering wheel of the vehicle, and a lateral acceleration of the vehicle. The controller determines that the intended path of the vehicle is straight when at least one of the yaw rate error, the steering angle, the yaw rate and the lateral acceleration is equal to or less than a predetermined value.

In some configurations, the vehicle includes a manual transmission having a clutch. The predetermined time period is extendable greater than 300 milliseconds if the clutch is depressed greater than a predetermined threshold value.

In some configurations, the vehicle mode is a drag racing mode or a line lock mode.

In another form, the present disclosure discloses a system for operating a vehicle in a vehicle mode. The system includes a drive axle, a differential, a plurality of sensors, and a controller. The drive axle has a first shaft and a second shaft. The first shaft is configured to drive a first wheel of a set of vehicle wheels and the second shaft is configured to drive a second wheel of the set of vehicle wheels. The differential is operable in a first differential mode in which the first shaft and the second shaft are allowed to rotate at different speeds, and a second differential mode in which the differential inhibits relative rotation between the first and second shafts. The plurality of sensors are configured to measure vehicle operating conditions. The controller is in communication with the plurality of sensors and the differential. The controller, when the vehicle mode is selected, is configured to determine if an intended path of the vehicle is straight based on signals from the plurality of sensors, determine if a vehicle speed is less than a predetermined vehicle speed based on the signals from the plurality of sensors, determine if a vehicle transmission is set to upshift within a first predetermined time period in response to the vehicle speed being greater than the predetermined vehicle speed, and operate the differential in the second differential mode for a second predetermined time period in response to the controller determining that the intended path of vehicle is straight and the transmission being set to upshift within the first predetermined time period.

In some configurations, the differential is an electronic limited slip differential.

In some configurations, the plurality of sensors include a first sensor, a second sensor, and a third sensor. The first sensor is configured to measure a yaw rate of the vehicle. The second sensor is configured to measure a steering angle of a steering wheel of the vehicle. The third sensor is configured to measure lateral acceleration of the vehicle. The controller determines a yaw rate error based on the measured yaw rate and determines that the intended path of the vehicle is straight when the yaw rate error is equal to or less than a predetermined yaw rate error and/or the measured yaw rate is equal to or less than a predetermined yaw rate, the measured steering angle is equal to or less than a predetermined steering angle, and the measured lateral acceleration is equal to or less than a predetermined lateral acceleration.

In some configurations, the plurality of sensors include a first sensor and a second sensor. The first sensor is configured to measure a speed of the vehicle and the second sensor is configured to measure at least one of a value indicative of a yaw rate error of the vehicle, a yaw rate of the vehicle, a steering angle of a steering wheel of the vehicle, and a lateral acceleration of the vehicle. The controller determines that the intended path of the vehicle is straight when at least one of the yaw rate error, the yaw rate, the steering angle, and the lateral acceleration is equal to or less than a predetermined value.

In some configurations, the predetermined vehicle speed is 80 kilometers per hour. The first predetermined time period is equal to or less than 0.05 seconds.

In some configurations, the second predetermined time period is equal to or less than 300 milliseconds.

In yet another form, the present disclosure discloses a method for operating a vehicle in a vehicle mode. The method includes measuring, using a plurality of sensors, vehicle operating conditions, determining, using a controller, if an intended path of the vehicle is straight based on the measured vehicle operating conditions, determining, using the controller, if a speed of the vehicle is less than a predetermined vehicle speed based on the measured vehicle operating conditions, and switching a differential, using the controller, when the vehicle mode is selected, from a first differential mode in which a first shaft and a second shaft are allowed to rotate at different speeds to a second differential mode in which the differential inhibits relative rotation between the first and second shafts in response to the controller determining that the intended path of the vehicle is straight and the vehicle speed is less than the predetermined vehicle speed.

In some configurations, the differential is an electronic limited slip differential.

In some configurations, the vehicle mode is a drag racing mode or a line lock mode.

In some configurations, the method further includes measuring, using a first sensor of the plurality of sensors, a yaw rate of the vehicle, measuring, using a second sensor of the plurality of sensors, a steering angle of a steering wheel of the vehicle, and measuring, using a third sensor of the plurality of sensors, a lateral acceleration of the vehicle. The controller determines a yaw rate error based on the measured yaw rate and determines that the intended path of the vehicle is straight when the yaw rate error is equal to or less than a predetermined yaw rate error and/or the measured yaw rate is equal to or less than a predetermined yaw rate, the measured steering angle is equal to or less than a predetermined steering angle, and the measured lateral acceleration is equal to or less than a predetermined lateral acceleration.

In some configurations, the method further includes measuring, using a first sensor of the plurality of sensors, a speed of the vehicle, and measuring, using a second sensor of the plurality of sensors, at least one of a value indicative of a yaw rate error of the vehicle, yaw rate of the vehicle, a steering angle of a steering wheel of the vehicle, and a lateral acceleration of the vehicle. The controller determines that the intended path of the vehicle is straight when at least one of the yaw rate error, the yaw rate, the steering angle, and the lateral acceleration is equal to or less than a predetermined value.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
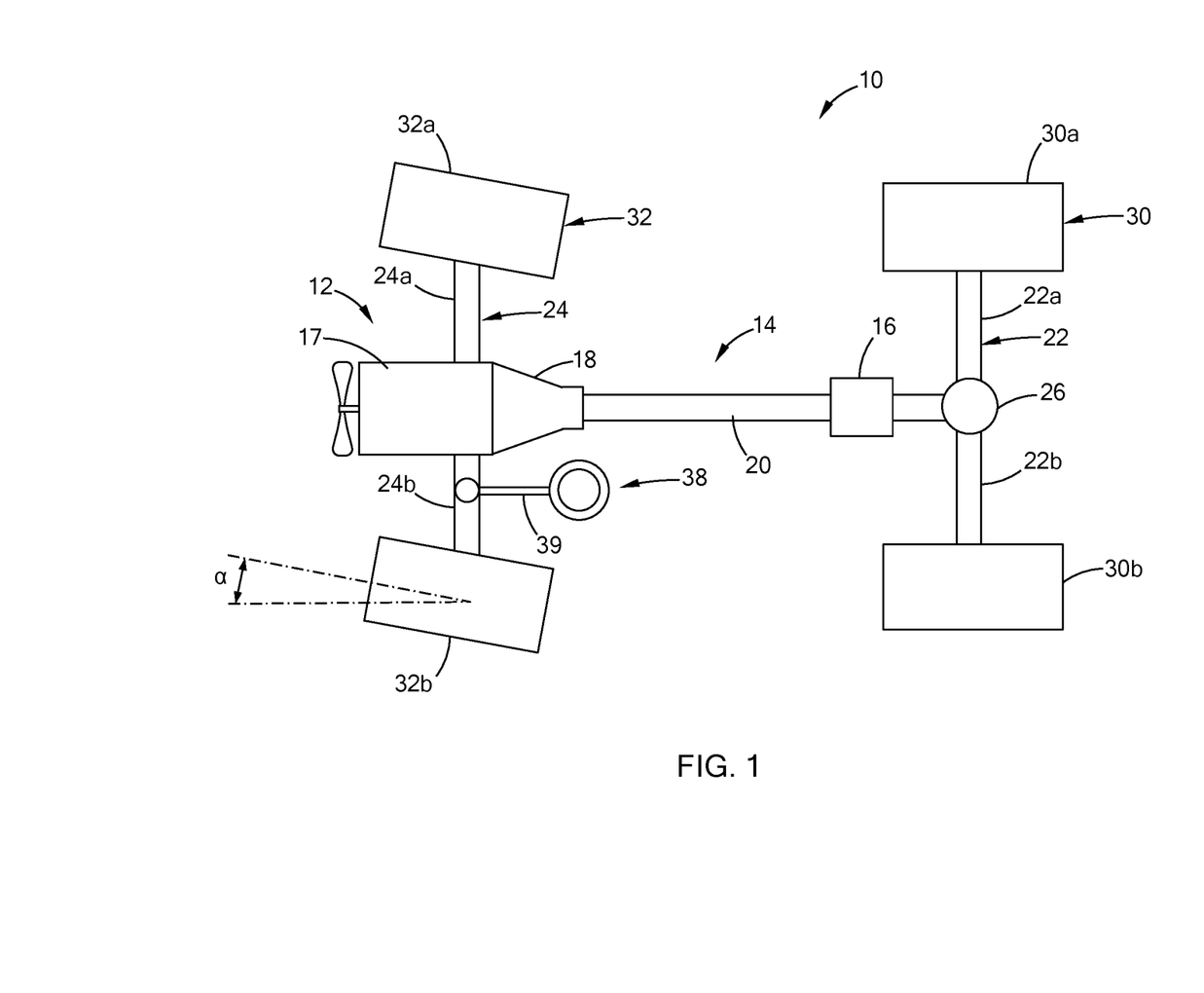
FIG. 1 is a schematic view of a vehicle including a vehicle performance system according to the principles of the present disclosure.
Figure 2:
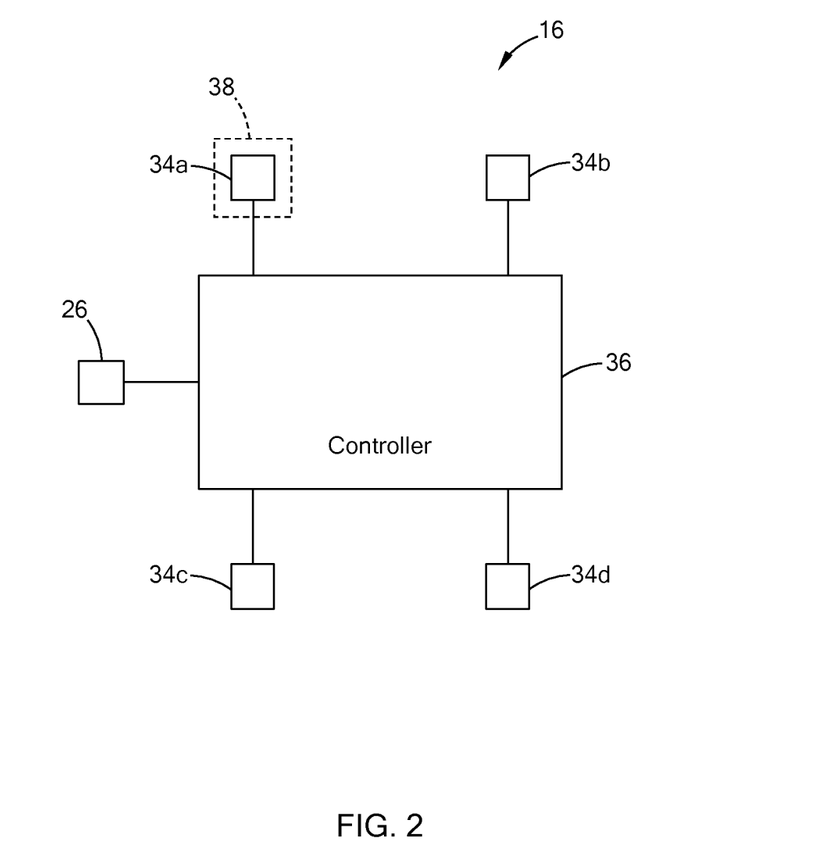
FIG. 2 is a block diagram showing components of the vehicle performance system of FIG. 1.

With reference to FIGS. 1 and 2, a vehicle 10 is provided that includes a powertrain system 12, a drivetrain system 14, and a performance system 16. The powertrain and drivetrain systems 12, 14 can be conventional systems, for example. In the particular configuration shown in FIG. 1, the powertrain system 12 includes, inter alia, an engine 17 and a transmission 18. The engine 17 may be an internal combustion engine or an electric motor, for example. The transmission 18 may be an automatic or manual transmission. The drivetrain system 14 includes, inter alia, a propeller shaft 20, a primary or drive axle 22, a secondary axle 24, and a rear differential 26. Rotary power (vehicle torque) generated by the powertrain system 12 is transmitted to the drivetrain system 14. That is, rotatory power generated by the powertrain system 12 is transmitted to the first drive axle 22 via the propeller shaft 20 to drive a set of rear wheels 30. The first drive axle 22 includes a first shaft 22a and a second shaft 22b. The first shaft 22a drives a first wheel 30a of the set of rear wheels 30 and the second shaft 22b drives a second wheel 30b of the set of rear wheels 30. In the example provided, the vehicle 10 is a 4-wheel-drive (4WD) or all-wheel-drive (AWD) vehicle such that the secondary axle 24 is also a drive axle and includes a first shaft 24a and a second shaft 24*b*. The first shaft 24*a* is connected to a first wheel 32*a* of a set of front wheels 32 and the second shaft 24*b* is connected to a second wheel 32*b* of the set of front wheels 32. In the example provided, the secondary axle 24 includes a front differential (not shown) that receives rotary power from the transmission 18, such as via a power take-off unit (PTU; not shown) or a transfer case (not shown) such that the first shaft 24*a* drives the first wheel 32*a* of the set of front wheels 32 and the second shaft 24*b* drives the second wheel 32*b* of the set of front wheels 32. In alternative configurations, the vehicle 10 may be a FWD vehicle or a RWD vehicle.

The rear differential 26 is operatively connected to the propeller shaft 20 and the first drive axle 22, and allows the set of rear wheels 30 to rotate at the same speed or at different speeds. The rear differential 26 may be any type of controllable differential such as an electronic limited slip differential. The rear differential 26 may be operable in a first differential mode in which the first shaft 22*a* and the second shaft 22*b* are allowed to rotate at different speeds, and a second differential mode in which the rear differential 26 inhibits relative rotation between the first shaft 22*a* and the second shaft 22*b*. For example, the first differential mode can be an open differential mode and the second differential mode can be a limited slip differential mode or a locked differential mode.

The rear differential 26 may be any suitable type of differential. In one form, the rear differential 26 may have a planetary differential gearset and include, inter alia, an input shaft or driveshaft (not shown), a housing (not shown), a ring gear (not shown), one or more planet gears (not shown), first and second output gears (not shown), and a clutch (not shown). The input shaft may connect to the powertrain system 12 and may receive rotary power from the powertrain system 12, e.g., from the propeller shaft 20. An input gear (not shown) may be connected to the input shaft. The input gear may be a separate component that is secured to the input shaft or may be an integral part of the input shaft. The input gear may be configured to mesh with the ring gear. The planet gears may be connected to the ring gear and may mesh with the first and second output gears. The first output gear may be connected to the first shaft 22*a*. The first output gear may be a separate component that is secured to the first shaft 22*a* or may be an integral part of the first shaft 22*a*. The second output gear may be connected to the second shaft 22*b*. The second output gear may be a separate component that is secured to the second shaft 22*b* or may be an integral part of the second shaft 22*b*.

The clutch (not shown) can be any suitable type of clutch that is operable to selectively permit or inhibit relative rotation between the first and second shafts 22*a*, 22*b*. In one form, the clutch (not shown) may include a set of plates (not shown) associated with (e.g., secured to) the housing (not shown) and a set of discs (not shown) associated with (e.g., secured to) at least one of the first and second shafts 22*a*, 22*b*. When the set of plates and the set of discs are disengaged from each other, the differential 26 is in the first differential mode and acts as an open differential. When the set of plates and the set of discs are engaged with each other, the differential 26 is in the second differential mode and acts as a limited slip differential. It should be understood that although the rear differential 26 is described above as a clutch-type limited slip differential, the rear differential 26 may be other suitable differentials. Additionally, while the rear differential 26 is described herein as having a planetary style differential gearset, other types of differential gearsets can be used. For example, the differential can include, inter alia, an input shaft or driveshaft (not shown) coupled to the propeller shaft 20, an input pinion gear (not shown) coupled to the input shaft for common rotation, a differential housing (not shown) supported for rotation about a differential axis transverse to the propshaft 20, a ring gear (not shown) coupled to the differential housing for common rotation with the housing, one or more differential pinion gears (not shown) coupled to the differential housing for common rotation with the differential housing about the differential axis but rotatable about relative to the differential housing about one or more pinion axes, first and second output side gears (not shown) meshingly engaged with the pinion gears and coupled to a respective first or second axle shaft 22*a*, 22*b* for rotation about the differential axis, and the clutch (not shown).

The performance system 16 includes sensors 34*a*, 34*b*, 34*c*, 34*d* and one or more controllers 36. The sensor 34*a* is associated with a steering assembly 38 and is configured to measure a steering angle α of a steering wheel 39 of the steering assembly 38. The sensor 34*a* may be an optical sensor, for example. The sensor 34*b* is associated with the vehicle 10 (e.g., positioned under the driver or passenger seat (not shown)) and is configured to measure a yaw rate (i.e., angular velocity of the vehicle 10 about its vertical axis (not shown) per second) of the vehicle 10. The sensor 34*b* may be a piezoelectric-type sensor or a micromechanical-type sensor, for example. The sensor 34*c* is associated with the vehicle 10 (e.g., positioned at the center of the vehicle such as in the center console) and is configured to measure lateral acceleration of the vehicle 10. The sensor 34*c* may be an accelerometer, for example. The sensor 34*d* is configured to measure a speed of the vehicle 10.

The controller 36 is in communication with the sensors 34*a*, 34*b*, 34*c*, 34*d* and the rear differential 26. The controller 36 may compare the measured steering angle to a predetermined steering angle. The predetermined steering angle may be equal to or less than +/−3 degrees, for example. The controller 36 may compare the measured yaw rate with an expected yaw rate to determine a yaw rate error. The controller 36 may then compare the determined yaw rate error to a predetermined yaw rate error. The predetermined yaw rate error may be equal to or less than +/−1.5 degrees/second, for example. In some configurations, the controller 36 may compare the measured yaw rate to a predetermined yaw rate. In such configurations, the predetermined yaw rate may be equal to or less than +/−1.5 degrees/second, for example. The controller 36 may also compare the measured lateral acceleration to a predetermined lateral acceleration. The predetermined lateral acceleration may be equal to or less than 0.1 gravity, for example. The controller 36 may switch the rear differential 26 between the first and second differential modes based in part on the data from the sensors 34*a*, 34*b*, 34*c*, 34*d*.

Figure 3:
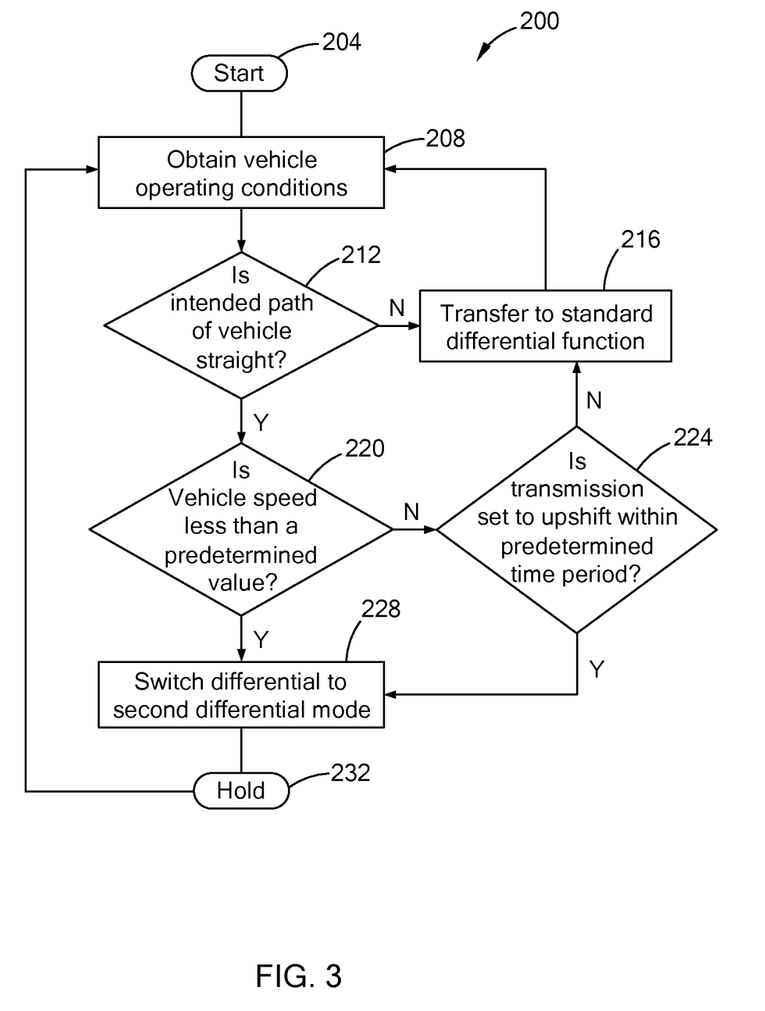
FIG. 3 is a flowchart depicting an algorithm of the vehicle performance system of FIG. 1 for operating the vehicle in a vehicle operating mode.

With reference to FIG. 3, a flowchart 200 showing an example implementation of a control algorithm (e.g., method) for switching the rear differential 26 from the first differential mode to the second differential mode is shown. The control algorithm begins at 204, when, for example, the vehicle operator selects to operate the vehicle 10 in a selected mode. The vehicle operator may select to operate the vehicle 10 in a selected mode while the vehicle 10 is at a stand still or in motion. The selected mode may be a drag mode or a line lock mode, for example. At 208, the control algorithm, using the controller 36, obtains the vehicle operating conditions such as the yaw rate, the lateral acceleration, the steering angle, and the vehicle speed. The vehicle operating conditions are measured using the sensors 34*a*, 34b, 34c, 34d and are communicated to the controller 36. The vehicle operating conditions may be measured intermittingly or continuously.

At 212, the control algorithm, using the controller 36, determines if the intended path of the vehicle 10 is straight. That is, the controller 36 may determine that the intended path of the vehicle 10 is straight when the yaw rate error is equal to or less than the predetermined yaw rate error (or the measured yaw rate is equal to or less than the predetermined yaw rate), the measured steering angle is equal to or less than the predetermined steering angle, and the measured lateral acceleration is equal to or less than the predetermined lateral acceleration. In some configurations, the controller 36 may determine that the intended path of the vehicle is straight when one or more of the yaw rate error (or measured yaw rate), the measured steering angle, and the measured lateral acceleration is equal to or less than a respective predetermined value.

If the intended path of the vehicle 10 is not straight, the control algorithm proceeds to 216, where the rear differential 26 is operated in the first differential mode also referred to as a standard differential function. If the intended path of the vehicle 10 is straight, the control algorithm proceeds to 220.

At 220, the control algorithm, using the controller 36, determines if the vehicle speed is less than a predetermined vehicle speed. In one form, the predetermined vehicle speed may be less than 80 kilometers per hour, though other speeds can be used. If the vehicle speed is greater than the predetermined vehicle speed, the control algorithm proceeds to 224; otherwise, the control algorithm proceeds to 228.

At 224, the control algorithm, using the controller 36, determines if the transmission 18 is set to upshift within a predetermined time period. In one form, the predetermined time period may be equal to or less than 0.05 seconds, for example. If the transmission 18 is set to upshift within the predetermined time period, the control algorithm proceeds to 228; otherwise, the control algorithm proceeds to 216.

At 228, the control algorithm, using the controller 36, switches the rear differential 26 to the second differential mode. In this way, torque generated by the engine 17 may be distributed advantageously to the set of rear wheels 30. At 232, the control algorithm, using the controller 36, holds the rear differential 26 in the second differential mode for a predetermined time period (e.g., this predetermined time period may be equal to or less than 300 milliseconds). The control algorithm, using the controller 36, then proceeds to 208.

In some configurations, when the transmission 18 is a manual transmission having a clutch, the control algorithm, using the controller 36, determines if the clutch is depressed greater than a predetermined threshold value (e.g., the predetermined threshold value may be greater than 25% of a fully depressed state of the clutch 60) after the rear differential 26 is switched to the second differential mode. If the clutch is depressed greater than the predetermined threshold value, the control algorithm, using the controller 36, continues to operate the rear differential 26 in the second differential mode; otherwise, the control algorithm proceeds to 216. The present disclosure provides the benefit of improving drag racing performance, for example, for the vehicle operator. In other words, when the operator intends for the vehicle to accelerate quickly in a straight line (e.g., during a drag race or for performance straight line acceleration), the system and methods of the present disclosure operates the differential 26 in a second differential mode. The present disclosure also provides the benefit of improving acceleration of the vehicle 10 when the line lock mode or drag race mode is selected.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for operating a vehicle in a vehicle mode, the system comprising:
   a drive axle having a first shaft and a second shaft, the first shaft configured to drive a first wheel of a set of vehicle wheels and the second shaft configured to drive a second wheel of the set of vehicle wheels;
   a differential operable in a first differential mode in which the first shaft and the second shaft are allowed to rotate at different speeds, and a second differential mode in which the differential inhibits relative rotation between the first and second shafts;

a plurality of sensors configured to measure vehicle operating conditions; and a controller in communication with the plurality of sensors and the differential, wherein the controller, when the vehicle mode is selected, is configured to:
determine if an intended path of the vehicle is straight based on signals from the plurality of sensors;
determine if a vehicle speed is less than a predetermined vehicle speed based on the signals from the plurality of sensors; and
operate the differential in the second differential mode for a predetermined time period in response to the controller determining that the intended path of the vehicle is straight and the vehicle speed is less than the predetermined vehicle speed.

2. The system of claim 1, wherein the differential is an electronic limited slip differential.

3. The system of claim 1, wherein the differential is a limited slip differential.

4. The system of claim 1, wherein the predetermined vehicle speed is equal to or less than 80 kilometers per hour.

5. The system of claim 1, wherein the predetermined time period is equal to or less than 300 milliseconds.

6. The system of claim 1, wherein the plurality of sensors include:
a first sensor configured to measure a yaw rate of the vehicle;
a second sensor configured to measure a steering angle of a steering wheel of the vehicle; and
a third sensor configured to measure lateral acceleration of the vehicle,
wherein the controller determines a yaw rate error based on the measured yaw rate and determines that the intended path of the vehicle is straight when the yaw rate error is equal to or less than a predetermined yaw rate error and/or the measured yaw rate is equal to or less than a predetermined yaw rate, the measured steering angle is equal to or less than a predetermined steering angle, and the measured lateral acceleration is equal to or less than a predetermined lateral acceleration.

7. The system of claim 1, wherein the plurality of sensors includes:
a first sensor configured to measure a speed of the vehicle; and
a second sensor configured to measure at least one of a value indicative of a yaw rate error of the vehicle, a yaw rate of the vehicle, a steering angle of a steering wheel of the vehicle, and a lateral acceleration of the vehicle,
wherein the controller determines that the intended path of the vehicle is straight when the at least one of the yaw rate error, the yaw rate, the steering angle, and the lateral acceleration is equal to or less than a predetermined value.

8. The system of claim 1, wherein the vehicle includes a manual transmission having a clutch, and wherein the predetermined time period is extendable greater than 300 milliseconds if the clutch is depressed greater than a predetermined threshold value.

9. The system of claim 1, wherein the vehicle mode is a drag racing mode or a line lock mode.

10. A system for operating a vehicle in a vehicle mode, the system comprising:
a drive axle having a first shaft and a second shaft, the first shaft configured to drive a first wheel of a set of vehicle wheels and the second shaft configured to drive a second wheel of the set of vehicle wheels;
a differential operable in a first differential mode in which the first shaft and the second shaft are allowed to rotate at different speeds, and a second differential mode in which the differential inhibits relative rotation between the first and second shafts;
a plurality of sensors configured to measure vehicle operating conditions; and
a controller in communication with the plurality of sensors and the differential, wherein the controller, when the vehicle mode is selected, is configured to:
determine if an intended path of the vehicle is straight based on signals from the plurality of sensors;
determine if a vehicle speed is less than a predetermined vehicle speed based on the signals from the plurality of sensors;
determine if a vehicle transmission is set to upshift within a first predetermined time period in response to the vehicle speed being greater than the predetermined vehicle speed; and
operate the differential in the second differential mode for a second predetermined time period in response to the controller determining that the intended path of vehicle is straight and the transmission being set to upshift within the first predetermined time period.

11. The system of claim 10, wherein the differential is an electronic limited slip differential.

12. The system of claim 10, wherein the plurality of sensors include:
a first sensor configured to measure a yaw rate of the vehicle;
a second sensor configured to measure a steering angle of a steering wheel of the vehicle; and
a third sensor configured to measure lateral acceleration of the vehicle,
wherein the controller determines a yaw rate error based on the measured yaw rate and determines that the intended path of the vehicle is straight when the yaw rate error is equal to or less than a predetermined yaw rate error and/or the measured yaw rate is equal to or less than a predetermined yaw rate, the measured steering angle is equal to or less than a predetermined steering angle, and the measured lateral acceleration is equal to or less than a predetermined lateral acceleration.

13. The system of claim 10, wherein the plurality of sensors includes:
a first sensor configured to measure a speed of the vehicle; and
a second sensor configured to measure at least one of a value indicative of a yaw rate error of the vehicle, a yaw rate of the vehicle, a steering angle of a steering wheel of the vehicle, and a lateral acceleration of the vehicle,
wherein the controller determines that the intended path of the vehicle is straight when the at least one of the yaw rate error, the yaw rate, the steering angle, and the lateral acceleration is equal to or less than a predetermined value.

14. The system of claim 10, wherein the predetermined vehicle speed is 80 kilometers per hour, and wherein the first predetermined time period is equal to or less than 0.05 seconds.

15. The system of claim 10, wherein the second predetermined time period is equal to or less than 300 milliseconds.

16. A method for operating a vehicle in a vehicle mode, the method comprising:
- measuring, using a plurality of sensors, vehicle operating conditions;
- determining, using a controller, if an intended path of the vehicle is straight based on the measured vehicle operating conditions;
- determining, using the controller, if a speed of the vehicle is less than a predetermined vehicle speed based on the measured vehicle operating conditions; and
- switching a differential, using the controller, when the vehicle mode is selected, from a first differential mode in which a first shaft and a second shaft are allowed to rotate at different speeds to a second differential mode in which the differential inhibits relative rotation between the first and second shafts in response to the controller determining that the intended path of the vehicle is straight and the vehicle speed is less than the predetermined vehicle speed.

17. The method of claim 16, wherein the differential is an electronic limited slip differential.

18. The method of claim 16, wherein the vehicle mode is a drag racing mode or a line lock mode.

19. The method of claim 16, further comprising:
- measuring, using a first sensor of the plurality of sensors, a yaw rate of the vehicle;
- measuring, using a second sensor of the plurality of sensors, a steering angle of a steering wheel of the vehicle; and
- measuring, using a third sensor of the plurality of sensors, a lateral acceleration of the vehicle,
- wherein the controller determines a yaw rate error based on the measured yaw rate and determines that the intended path of the vehicle is straight when the yaw rate error is equal to or less than a predetermined yaw rate error and/or the measured yaw rate is equal to or less than a predetermined yaw rate, the measured steering angle is equal to or less than a predetermined steering angle, and the measured lateral acceleration is equal to or less than a predetermined lateral acceleration.

20. The method of claim 16, further comprising:
- measuring, using a first sensor of the plurality of sensors, a speed of the vehicle; and
- measuring, using a second sensor of the plurality of sensors, at least one of a value indicative of a yaw rate error of the vehicle, a yaw rate of the vehicle, a steering angle of a steering wheel of the vehicle, and a lateral acceleration of the vehicle,
- wherein the controller determines that the intended path of the vehicle is straight when the at least one of the yaw rate error, the yaw rate, the steering angle, and the lateral acceleration is equal to or less than a predetermined value.

* * * * *